United States Patent
Kausar

(10) Patent No.: US 11,059,078 B2
(45) Date of Patent: Jul. 13, 2021

(54) UNDERWATER SENSOR PROTECTION DEVICE AND METHOD EMPLOYED THEREOF

(71) Applicant: Asif Ali Kausar, Saratoga, CA (US)

(72) Inventor: Asif Ali Kausar, Saratoga, CA (US)

( * ) Notice: Subject to any disclaimer, the term of this patent is extended or adjusted under 35 U.S.C. 154(b) by 283 days.

(21) Appl. No.: 16/404,772

(22) Filed: May 7, 2019

(65) Prior Publication Data

US 2019/0337029 A1  Nov. 7, 2019

Related U.S. Application Data

(60) Provisional application No. 62/667,642, filed on May 7, 2018.

(51) Int. Cl.
*G01D 11/24* (2006.01)
*B08B 9/032* (2006.01)

(52) U.S. Cl.
CPC .......... *B08B 9/0328* (2013.01); *G01D 11/245* (2013.01)

(58) Field of Classification Search
CPC ....... G01D 11/245; G01F 23/00; G01F 22/00; B08B 9/0328
See application file for complete search history.

(56) References Cited

U.S. PATENT DOCUMENTS

2017/0052053 A1\* 2/2017 Yamana ................ G01F 23/246

\* cited by examiner

*Primary Examiner* — Jamel E Williams

(57) ABSTRACT

Exemplary embodiments of the present disclosure are directed towards an underwater sensor protection device and method employed thereof. The underwater sensor protection device comprises a focal tube. The focal tube comprises at least one open end and at least one top closed end, the top closed end is connected to a control board and the open end is kept open, the control board comprises an air pump and a solenoid valve, the focal tube is submerged in water level for regulating the air pump. Sensors are positioned in the focal tube. Air is passed through an air tube to the focal tube and vacates the volume of water within the focal tube for avoiding water contact with the sensors, and air bubbles are generated by passing air via the air tube for longer duration into the focal tube thereby performing cleaning operation of the sensors.

7 Claims, 6 Drawing Sheets

UNDERWATER SENSOR PROTECTION DEVICE AND METHOD EMPLOYED THEREOF

CROSS REFERENCE TO RELATED APPLICATIONS

This application claims priority from U.S. Provisional Application No. 62/667,642 filed on May 7, 2018, entitled "UNDERWATER SENSOR PROTECTION DEVICE AND METHOD EMPLOYED THEREOF", the content of which is incorporated by reference herein in its entirety.

TECHNICAL FIELD

The present disclosure relates to the field of a sensor device for collecting water environmental data. More particularly, the present disclosure relates to an underwater sensor protection device and method employed thereof.

BACKGROUND

Generally, water data collection has been completed using instruments lowered from ships, or moored instrument arrays which must be recovered. Conventionally, different numerous apparatus available to measure various ocean parameters. For example, the ocean parameters are water temperature, depth, conductivity, salinity, sound speed, optical properties, nutrient availability, etc., may provide valuable information for a number of divergent uses.

One common apparatus consists of a set of small probes attached to a large metal rosette wheel. The rosette is lowered on a cable down to the seafloor, and the water properties are observed via a conducting cable connecting the apparatus to a remotely operated computer. Any sensor probe, when kept in water over a prolonged period of time, gets a variety of constituents deposited on its surface. In the majority of cases, it affects the accuracy of the readings registered by the sensors. Hence, the sensor probes are damaged due to the contact of water and also which can increase the duration for which the water gets in contact with the sensor probes.

In the light of the aforementioned discussion there exists a need for a device and method that would ameliorate or overcome the above-mentioned disadvantage.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A more complete appreciation of the present invention and the scope thereof can be obtained from the accompanying drawings which are briefly summarized below and the following detailed description of the presently preferred embodiments.

Exemplary embodiments of the present disclosure are directed towards an underwater sensor protection device and method employed thereof.

According to an exemplary embodiment of the present disclosure, the underwater sensor protection device includes a focal tube, a control board, air tube, air pump, a solenoid valve, and multiple sensors.

Another exemplary embodiment of the present disclosure, the underwater sensor protection device further includes the control board connected to a top closed end of the focal tube and the control board further includes the air pump and the solenoid valve. The focal tube further includes air tube is connected to the air pump.

Another exemplary embodiment of the present disclosure, the underwater sensor protection device further includes multiple sensors connected to a control board. The multiple air pumps and the multiple solenoid valves also connected to the control board. The control board is configured to control and operation of the multiple sensors for reducing the contact time duration between the water level and the multiple sensors.

Another exemplary embodiment of the present disclosure, the underwater sensor protection device further includes multiple sensors placed in the focal tube.

Another exemplary embodiment of the present disclosure, the underwater sensor protection device further includes a single sensor placed in a focal tube and further the single sensor placed in the multiple focal tubes.

Another exemplary embodiment of the present disclosure, the underwater sensor protection device is submerged in the water level for regulating the air pump in a periodic manner by the solenoid valve and the air is passed through the air tube to the focal tube and vacates the volume of water within the focal tube for avoiding water contact with multiple sensors.

Another exemplary embodiment of the present disclosure, the underwater sensor protection device further includes the air displaces water within the focal tube thereby reduces the water level and further reducing time duration of the water contact with the multiple sensors, and generating multiple air bubbles by passing air via the air tube for longer duration into the focal tube thereby performing cleaning operation of the sensors.

Another exemplary embodiment of the present disclosure, the underwater sensor protection device comprises at least one focal tube and at least one control board.

Another exemplary embodiment of the present disclosure, at least one focal tube comprises at least one open end and at least one top closed end, the at least one top closed end is connected to the at least one control board and the at least one open end is kept open.

Another exemplary embodiment of the present disclosure, the at least one control board comprises at least one air pump and at least one solenoid valve, the at least one focal tube is submerged in water level for regulating the at least one air pump.

Another exemplary embodiment of the present disclosure, the underwater sensor protection device comprises a plurality of sensors positioned in the at least one focal tube.

Another exemplary embodiment of the present disclosure, the underwater sensor protection device comprises at least one air tube is connected to the at least one air pump and the at least one air tube is positioned in the at least one focal tube, air is passed through the at least one air tube to the at least one focal tube and vacates the volume of water within the at least one focal tube for avoiding water contact with the plurality of sensors, and a plurality of air bubbles is generated by passing air via the at least one air tube for longer duration into the at least one focal tube thereby performing cleaning operation of the plurality of sensors.

An objective of the present disclosure is directed towards an underwater sensor protection device for increasing lifetime of sensor probes by protecting from water or fluid contact or reducing the period of contact with water or fluid.

Another objective of the present disclosure is directed towards an underwater sensor protection device for increasing life of the sensors while reducing maintenance cost. This device cannot change the chemistry and physical property of the liquid or water.

Another objective of the present disclosure is directed towards an underwater sensor protection device for increasing the duration for which the sensors report accurate data.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1A:
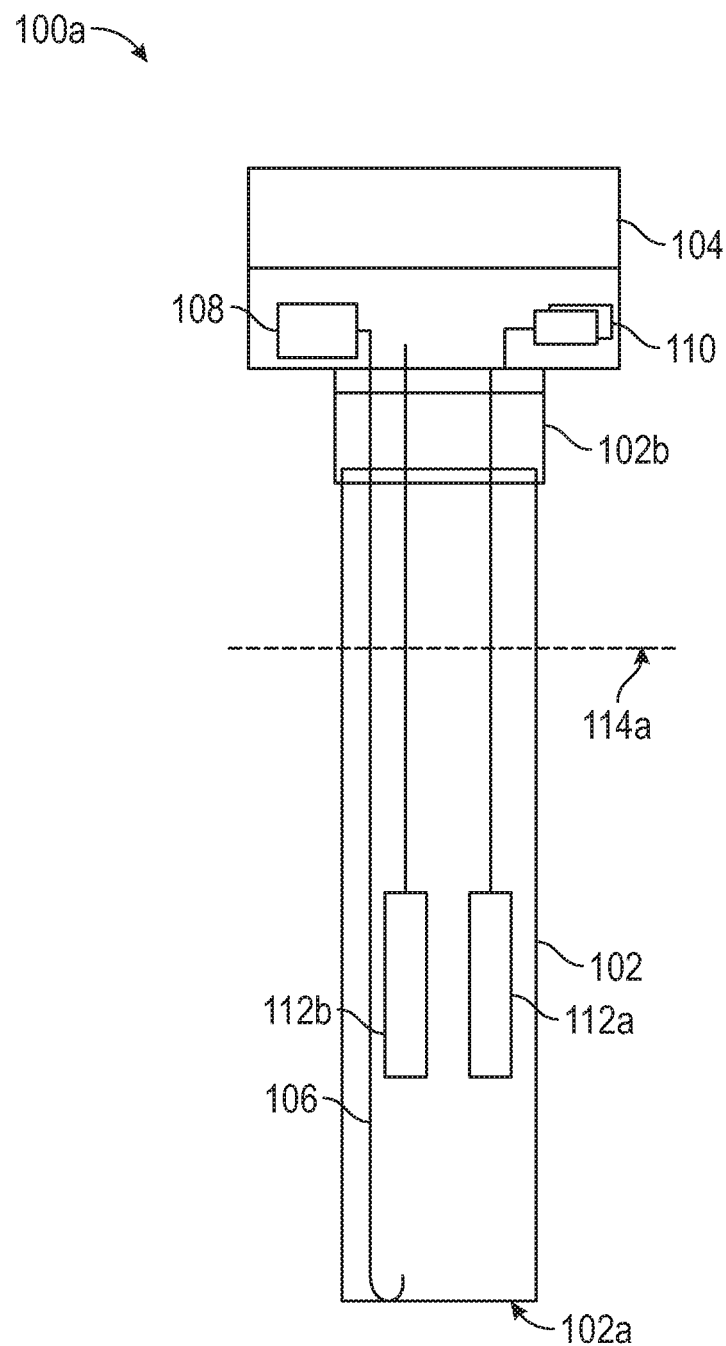
FIG. 1A is a diagram depicting an embodiment of an underwater sensor protection device, according to exemplary embodiments of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1A is a diagram 100a, depicting an embodiment of an underwater sensor protection device, according to exemplary embodiments of the present disclosure. The underwater sensor protection device 100a depicting multiple sensors contact with the water level. The underwater sensor protection device 100a includes a focal tube 102, a control board 104, an air tube 106, an air pump 108, a solenoid valve 110 and multiple sensors 112a, and 112b. The focal tube 102 includes an open end 102a and a top closed end 102b. The focal tube 102 may be referred to as a PVC tube (polyvinyl chloride tube), without limiting the scope of the disclosure. The top closed end 102b of the focal tube 102 is connected to the control board 104 and the other end 102a of the focal tube 102 is kept open. The control board 104 further includes the air pump 108 and the solenoid valve 110. The multiple sensors 112a, 112b placed in the focal tube 102. The air tube 106 is connected to the air pump 108 and the air tube 106 is placed in the focal tube 102.

Figure 1B:
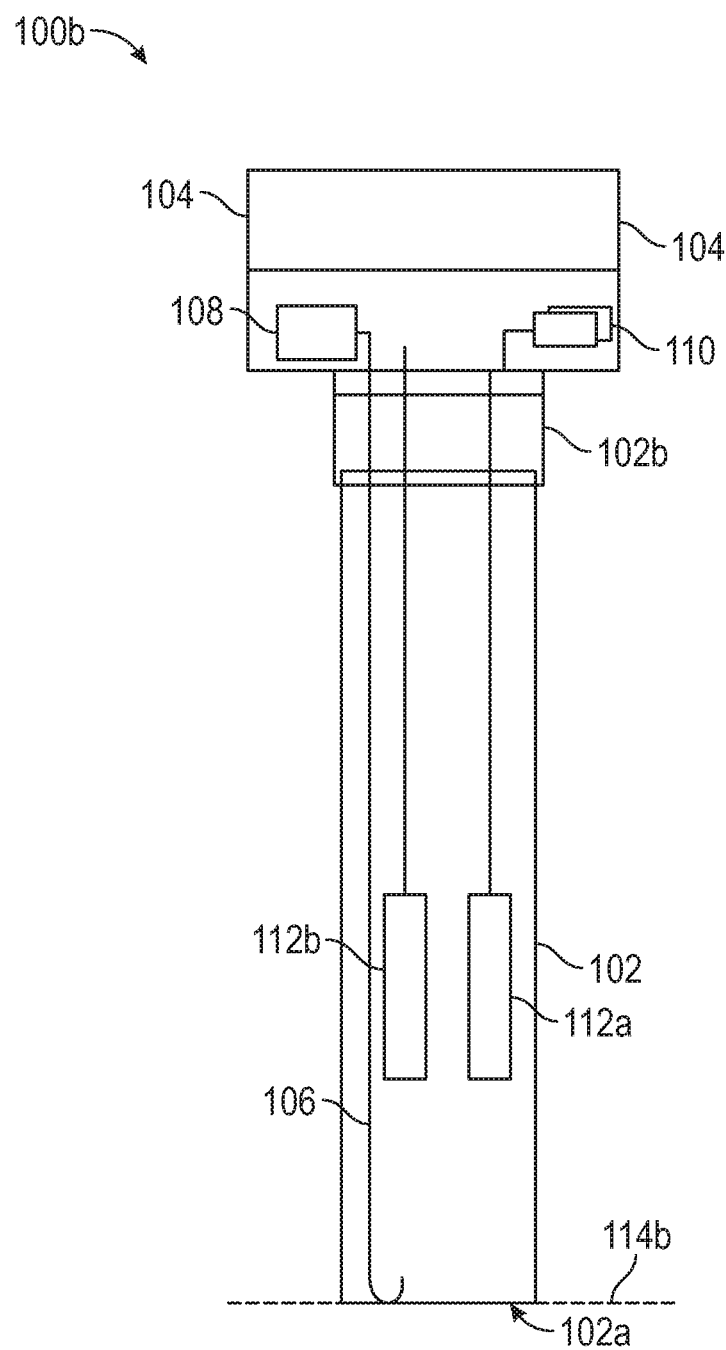
FIG. 1B is a diagram depicting another embodiment of an underwater sensor protection device, according to exemplary embodiments of the present disclosure.

As shown in FIG. 1A, the underwater sensor protection device 100a is submerged in the water level 114a for regulating the air pump 108 in a periodic manner by the solenoid valve 110. The air is passed through the air tube 106 to the focal tube 102 and vacates the volume of water within the focal tube 102 for avoiding water contact 114b with multiple sensors 112a, 112b as shown in FIG. 1B. The air displaces water within the focal tube 102 thereby reduces the water level 114b and further reducing time duration of the water contact 114b with the multiple sensors 112a, 112b as shown in FIG. 1B. Multiple air bubbles are generated via the air tube 106 for longer duration into the focal tube 102 thereby performing cleaning operation of the sensors 112a, 112b as shown in FIG. 1B.

Figure 2A:
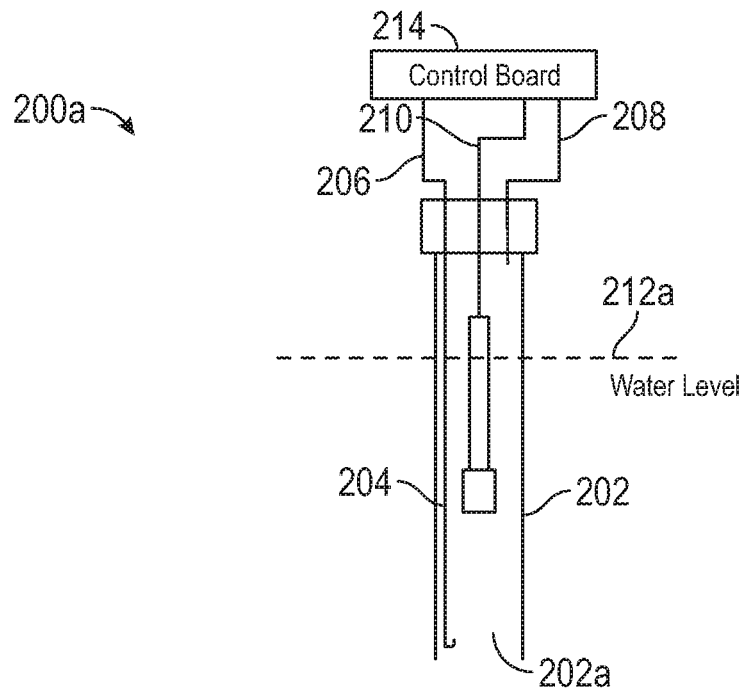
FIG. 2A is a diagram depicting another embodiment of an underwater sensor protection device, according to exemplary embodiments of the present disclosure.

Referring to FIG. 2A is a diagram 200a, depicting another embodiment of the underwater sensor protection device, according to exemplary embodiments of the present disclosure. The underwater sensor protection device 200a depicting a single sensor placed in a focal tube contact with the water level. The underwater sensor protection device includes a focal tube 202, an air tube 204, air pump 206, a solenoid valve 208 and a sensor 210. The bottom part 202a of the focal tube 202 is kept open for submerging the focal tube 202 into the water level. The air tube 204 is connected to the air pump 206 and which is placed in the focal tube 202. The sensor 210 is positioned in the focal tube 202. The focal tube 202 is submerged in the water level 212a for regulating the air pump 206 in a periodic manner by the solenoid valve 208. The air pump 206 and the solenoid valve 208 further connected to a control board 214. The sensor 210 is connected to the control board 214 for controlling an operation of the sensor 210 and which is submerged in the water contact 212a.

Figure 2B:
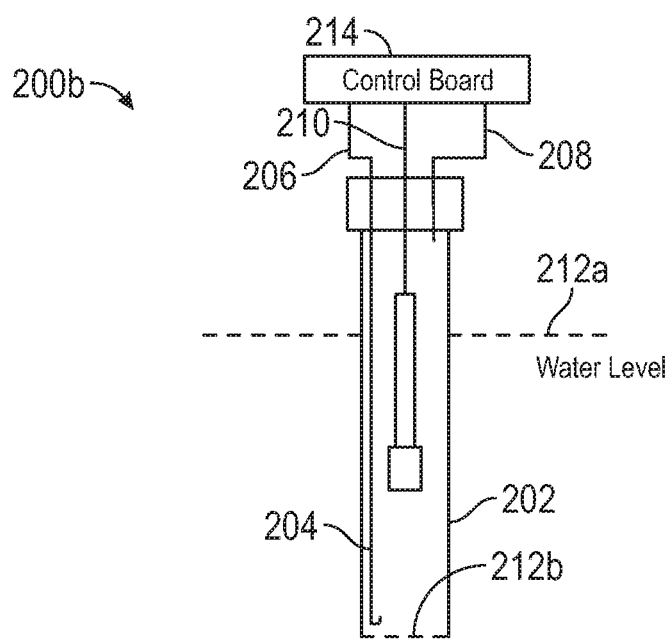
FIG. 2B is a diagram depicting another embodiment of an underwater sensor protection device, according to exemplary embodiments of the present disclosure.

Air is passed through the air tube 204 to the focal tube 202 and vacates the volume of water within the focal tube 202 for avoiding water contact 212b with the sensor 210 as shown in FIG. 2B. The air displaces water within the focal tube 202 thereby reduces the water level 212b and further reducing time duration of the water contact 212b with the sensor 210 as shown in FIG. 2B. Multiple air bubbles are generated by passing air via the air tube 204 for longer duration into the focal tube 202 thereby performing cleaning operation of the sensor 210 as shown in FIG. 2B.

Figure 3A:
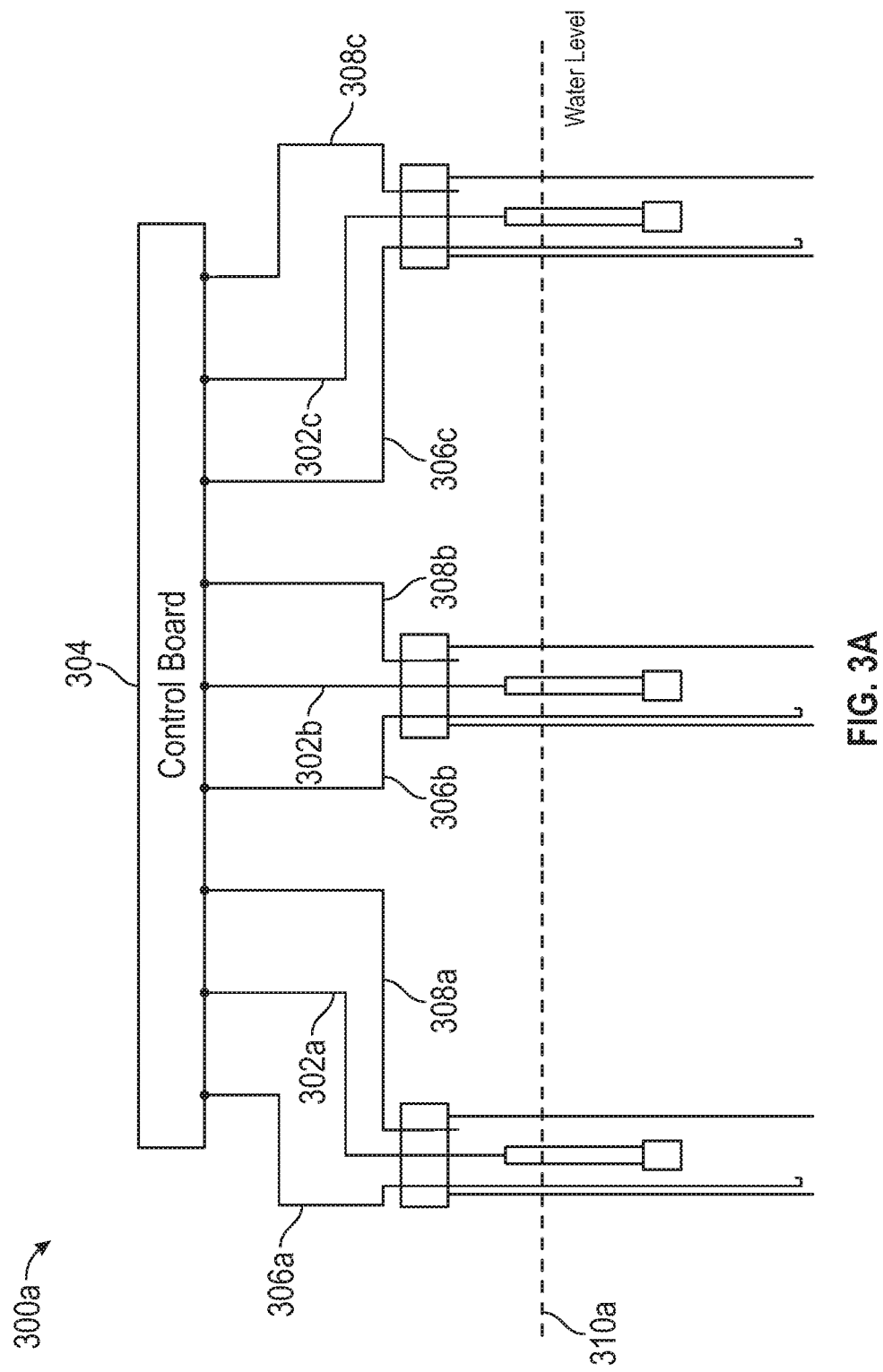
FIG. 3A is a diagram depicting another embodiment of an underwater sensor protection device, according to exemplary embodiments of the present disclosure.

Referring to FIG. 3A is a diagram 300a, depicting another embodiment of the underwater sensor protection device, according to exemplary embodiments of the present disclosure. The underwater sensor protection device 300a depicting a various configuration of multiple sensors placed in multiple focal tubes contact with the water level. The various configuration of multiple sensors 302a, 302b, and 302c are connected to the control board 304. The multiple air pumps 306a, 306b, 306c and the multiple solenoid valves 308a, 308b, 308c are connected to the control board 304. The control board 304 is configured to control and operation of the multiple sensors 302a, 302b, 302c and the multiple sensors 302a, 302b, 302c which is further contact with the water level 310a.

Figure 3B:
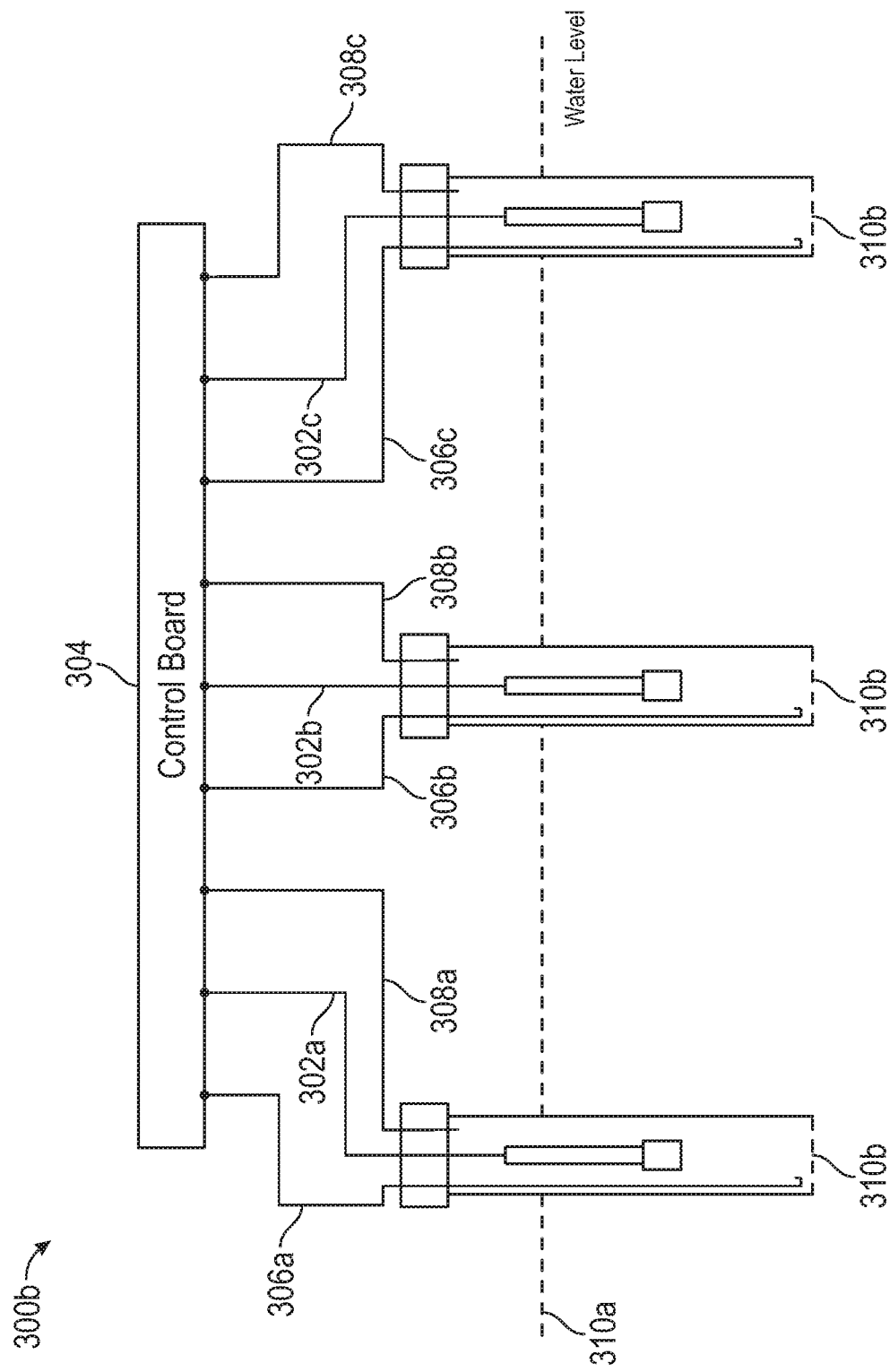
FIG. 3B is a diagram depicting another embodiment of an underwater sensor protection device, according to exemplary embodiments of the present disclosure.

Referring to FIG. 3B is a diagram 300b, depicting another embodiment of the underwater sensor protection device, according to exemplary embodiments of the present disclosure. The underwater sensor protection device 300b depicting the various configuration of multiple sensors sensor placed in multiple focal tubes without contact water level. The various configuration of multiple sensors 302a, 302b, and 302c are connected to the control board 304. The multiple air pumps 306a, 3026b, 306c and the multiple solenoid valves 308a, 308b, 308c are connected to the control board 304. The control board 304 is configured to control and operation of the multiple sensors 302a, 302b, 302c for reducing the contact time duration between the water level 310b and the multiple sensors 302a, 302b, 302c.

Figure 4:
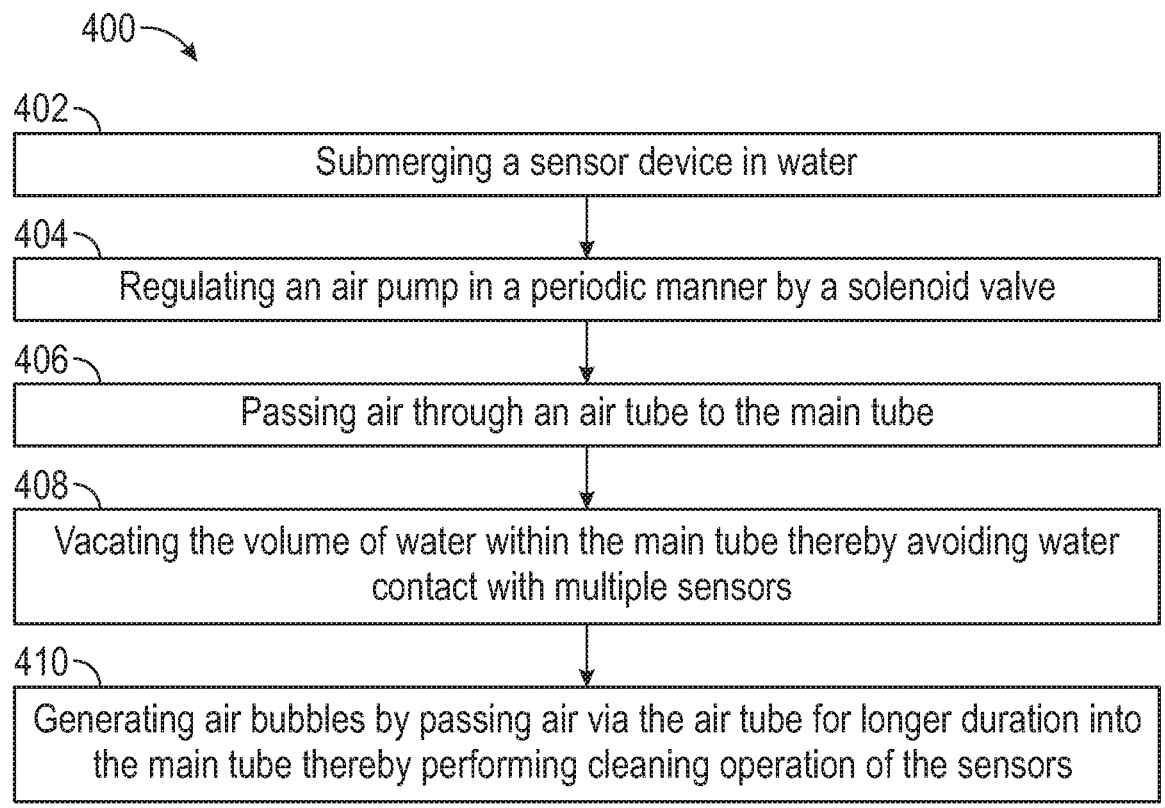
FIG. 4 is a flow diagram depicting a method for reducing contact time duration between the water and the multiple sensors, according to exemplary embodiments of the present disclosure.

Referring to FIG. 4 is a flow diagram 400, depicting a method for reducing contact time duration between the water level and the multiple sensors, according to exemplary embodiments of the present disclosure. The method starts at step 402 by submerging a sensor device in water. The method continues at step 404 by regulating an air pump in a periodic manner by a solenoid valve. The method continues at step 406 by supplying air is passed through an air tube to the focal tube. The method continues at step 408 by vacating the volume of water within the focal tube thereby avoiding water contact with multiple sensors. The method continues at step 410 by generating air bubbles by passing air via the air tube for longer duration into the focal tube thereby performing the cleaning operation of the sensors.

The present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. An underwater sensor protection device, comprising:
at least one focal tube comprises at least one open end and at least one top closed end, whereby the at least one top closed end is connected to at least one control board and the at least one open end is kept open, the at least one control board comprises at least one air pump and at least one solenoid valve, the at least one focal tube is submerged in water level for regulating the at least one air pump;
a plurality of sensors is positioned in the at least one focal tube;
at least one air tube is connected to the at least one air pump and the at least one air tube is positioned in the at least one focal tube, air is passed through the at least one air tube to the at least one focal tube and vacates the volume of water within the at least one focal tube for avoiding water contact with the plurality of sensors; and
a plurality of air bubbles is generated by passing air via the at least one air tube for longer duration into the at least one focal tube thereby performing cleaning operation of the plurality of sensors.

2. The underwater sensor protection device of claim 1, wherein the at least one solenoid valve is configured to regulate the at least one air pump in a periodic manner.

3. The underwater sensor protection device of claim 1, wherein air displaces water within the at least one focal tube thereby reduces the water level and further reducing time duration of the water contact within the plurality of sensors.

4. The underwater sensor protection device of claim 1, wherein the plurality of sensors is connected to the at least one control board for controlling an operation of the plurality of sensors and which are submerged in the water contact.

5. An underwater sensor protection device, comprising:
at least three focal tubes connected to at least one control board, the at least three focal tubes comprise open ends are kept open and closed ends are connected to the at least one control board;
at least three air pumps and at least three solenoid valves are connected to the at least one control board, whereby the at least one control board is configured to control an operation of at least three sensors and the at least three sensors contact with the water level, the at least three focal tubes are submerged in water level for regulating the at least three pumps;
at least one air tube is connected to the at least one air pump and the at least one air tube is positioned in the at least one focal tube, air is passed through the at least one air tube to the at least one focal tube and vacates the volume of water within the at least one focal tube for avoiding water contact with the at least one sensor; and
a plurality of air bubbles is generated by passing air via the at least one air tube for longer duration into the at least one focal tube thereby performing cleaning operation of the at least three sensors.

6. The underwater sensor protection device of claim 1, wherein the at least one control board is configured to control an operation of the at least three sensors for reducing the contact time duration between the water level and the at least three sensors.

7. A method, comprising:
submerging at least one focal tube in water level, whereby the at least one focal tube comprises at least one open end is kept open and at least one top closed end is connected to at least one control board;
regulating at least one air pump in a periodic manner by at least one solenoid valve, whereby the at least one solenoid valve and the at least one air pump are connected to the at least one control board and the at least one control board is configured to control and operation of a plurality of sensors and the plurality of sensors contact with the water level;
passing air through at least one air tube to the at least one focal tube and vacating the volume of water within the at least one focal tube for avoiding water contact with the plurality of sensors, the at least one air tube is connected to the at least one air pump and the at least one air tube is positioned in the at least one focal tube; and
generating a plurality of air bubbles by passing air via the at least one air tube for longer duration into the at least one focal tube thereby performing cleaning operation of the plurality of sensors.

* * * * *